United States Patent
Schwarz et al.

(10) Patent No.: US 6,880,857 B2
(45) Date of Patent: Apr. 19, 2005

(54) FASTENING DEVICE FOR A BELT ROLLER

(75) Inventors: Hartmut Schwarz, Engelsbrand (DE); Reza Shakory-Tabrizi, Markgroeningen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 2 days.

(21) Appl. No.: 10/212,884

(22) Filed: Aug. 7, 2002

(65) Prior Publication Data

US 2003/0030265 A1 Feb. 13, 2003

(30) Foreign Application Priority Data

Aug. 8, 2001 (DE) .......................................... 101 39 037

(51) Int. Cl.[7] .............................................. B60R 22/00
(52) U.S. Cl. ............... 280/801.1; 280/808; 296/187.01; 296/210
(58) Field of Search ............................. 280/801.1, 807, 280/808; 297/468, 474, 481, 475, 483; 296/185, 225, 210, 187.01

(56) References Cited

U.S. PATENT DOCUMENTS

| | | | | |
|---|---|---|---|---|
| 4,167,277 A | * | 9/1979 | Rumpf | .................. 280/807 |
| 5,253,896 A | | 10/1993 | Verbeski | |
| 6,086,100 A | * | 7/2000 | Corporon et al. | ........... 280/808 |

FOREIGN PATENT DOCUMENTS

| | | | | |
|---|---|---|---|---|
| DE | 3343104 A1 | 6/1985 | | |
| DE | 3318740 C2 | 7/1987 | | |
| DE | 3636912 C2 | 2/1994 | | |
| DE | 4343531 A1 | 9/1994 | | |
| DE | 19651092 A1 | 7/1997 | | |
| DE | 19714381 A1 | 4/1998 | | |
| DE | 19647167 C2 | 11/1998 | | |
| DE | 19735640 A1 | 2/1999 | | |
| DE | 20110185 U1 | 10/2001 | | |
| JP | 52-49526 | * | 4/1977 | ................. 280/807 |
| JP | 54-18531 | * | 2/1979 | ............. 280/801.1 |
| JP | 59-14546 | * | 1/1984 | ................. 280/807 |
| JP | 6-219241 | | 8/1994 | |

* cited by examiner

Primary Examiner—Eric Culbreth
(74) Attorney, Agent, or Firm—Crowell & Moring LLP

(57) ABSTRACT

A fastening device for a belt roller in a motor vehicle is inserted in a cutout of a vehicle body part and is connected on an edge side with the vehicle body part. In order to create a fastening device for a belt roller which permits improved fastening, the cutout can be constructed in the vehicle body part such that the cutout is closed in a surrounding manner.

6 Claims, 2 Drawing Sheets

FASTENING DEVICE FOR A BELT ROLLER

This application claims the priority of German application 101 39 037.8, filed Aug. 8, 2001, the disclosure of which is expressly incorporated by reference herein.

BACKGROUND AND SUMMARY OF THE INVENTION

The present invention relates to a fastening device for a belt roller in a motor vehicle in which the fastening device is inserted in a cutout of a vehicle body part and connected on an edge side with the vehicle body part.

A fastening device for a seat belt deflection fitting is known from German Patent Document DE 197 35 640 A1. This fastening device is fastened to a column of the vehicle. The column is made of an inside panel, an outside panel, and, optionally, a reinforcing profile inserted between the inside panel and the outside panel. A laterally open cutout is provided at the interior panel for receiving the fastening device. At the edge of this cutout, notches are provided at the inside panel, so that triple overlaps are avoided in the area of the weld seams.

Furthermore, it is known from German Patent Document DE 43 43 531 A1 to arrange a belt retractor for rear seats on a rearward side of a metal-sheet-shaped fastening device. This fastening device is received in a cavity which is formed in a reinforcing member. A recess is provided at this point in the inside panel.

With respect to this state of the art, it is an object of the invention to provide a fastening device for a belt roller which permits improved fastening.

According to the invention, this object is achieved by constructing the cutout in the vehicle body part such that this cutout is closed in a surrounding manner. As a result, the overall stability of a composite of the vehicle body part and the fastening device is improved. Also, with high forces which may occur in an accident, it is ensured that connection between the fastening device and the vehicle body part is not opened up in areas which would rapidly lead to failure of the entire connection between the fastening device and the vehicle body part. Finally, the surrounding connection also increases the stability of the vehicle body part, because the cutout formed in the vehicle body part is completely closed by the fastening device.

As an advantageous further development, it is also suggested that the fastening device be inserted into the vehicle body part such that a pot-shaped area constructed for receiving the belt roller in the fastening device extends through the vehicle body part. If possible, in this construction of the fastening device, a completely surrounding edge is formed on the fastening device which—viewed in the pull-out direction—comes to be situated behind the vehicle body part. This reaching-behind arrangement, in addition to the already provided connection (welding, riveting, gluing, or others) between the fastening device and the vehicle body part, results in a form-locking connection which further reduces the risk of the fastening device detaching from the vehicle body part.

The illustrated fastening device can be used for mounting a belt roller; in this case, the angular position of the belt roller is defined. The fastening device, in this case, is used as an adapter in order to adapt an existing belt roller, in which a certain angular installation position is always constructively defined, to the concrete installation situation in the vehicle body part.

In an advantageous further development of this use, an essentially horizontal angular position of the belt roller may be adjusted. A particularly large number of belt rollers is suitable for this installed position. Furthermore, the fastening device can be arranged such that the belt roller is suspended. The use of the fastening device is particularly advantageous in a vehicle having a fast back. These vehicles always have a sloped upper side member which is particularly suitable as a vehicle body part for receiving the fastening device.

The invention will be explained in detail by way of an embodiment illustrated in the drawing figures.

DETAILED DESCRIPTION OF THE INVENTION

Figure 1:
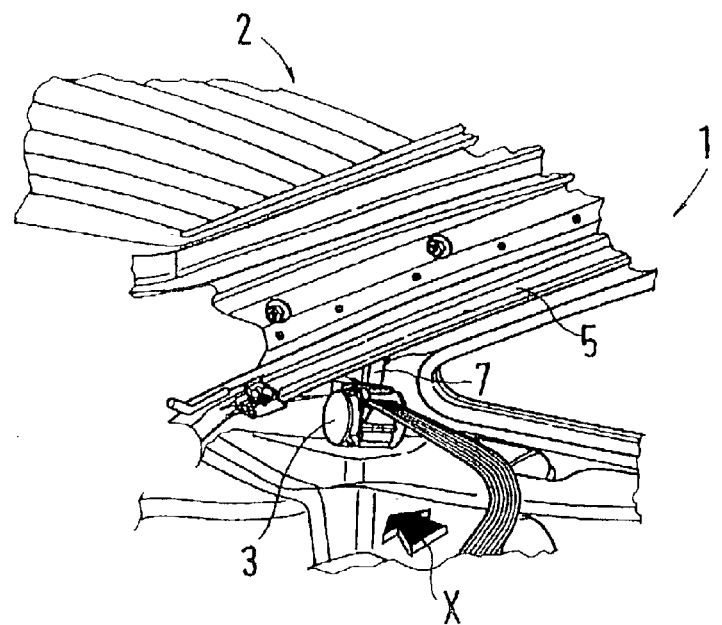
FIG. 1 is a view of the interior side of a side plate of a motor vehicle diagonally from the rear.

FIG. 1 illustrates a side plate 1 of a motor vehicle, not shown in detail, which, in a rear area 2, is constructed with a fast back shape. A belt roller 3 for a rear seat system, which is not shown, is to be fastened to a side member 5 having two half shells 6, 13 (see FIG. 3). In this case, the lower half shell 6 is constructed by a corresponding area of the side plate 1.

Figure 2:
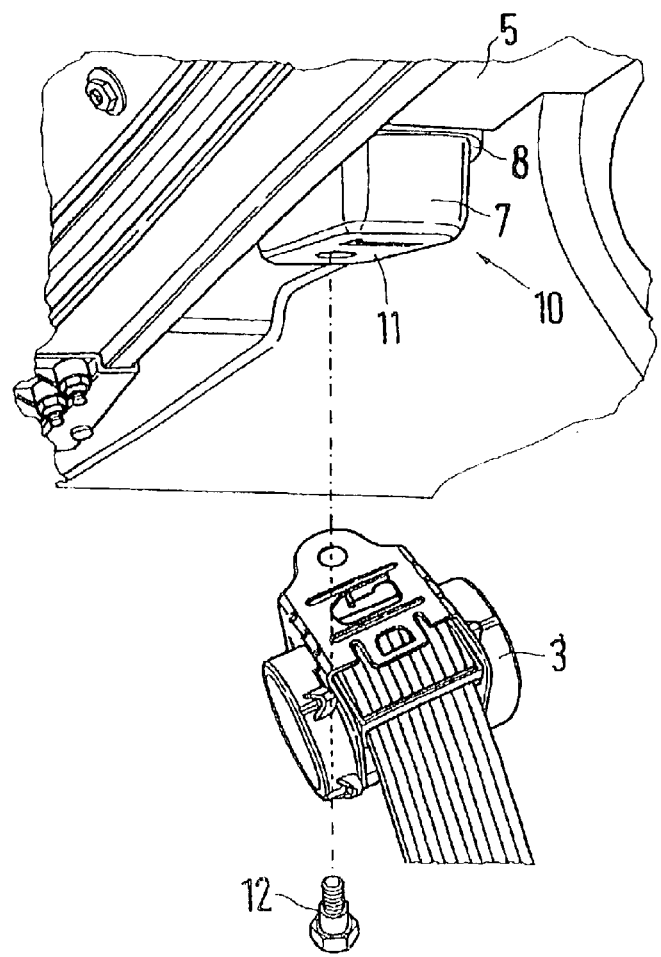
FIG. 2 is a detailed view from the direction X indicated in FIG. 1.
Figure 3:
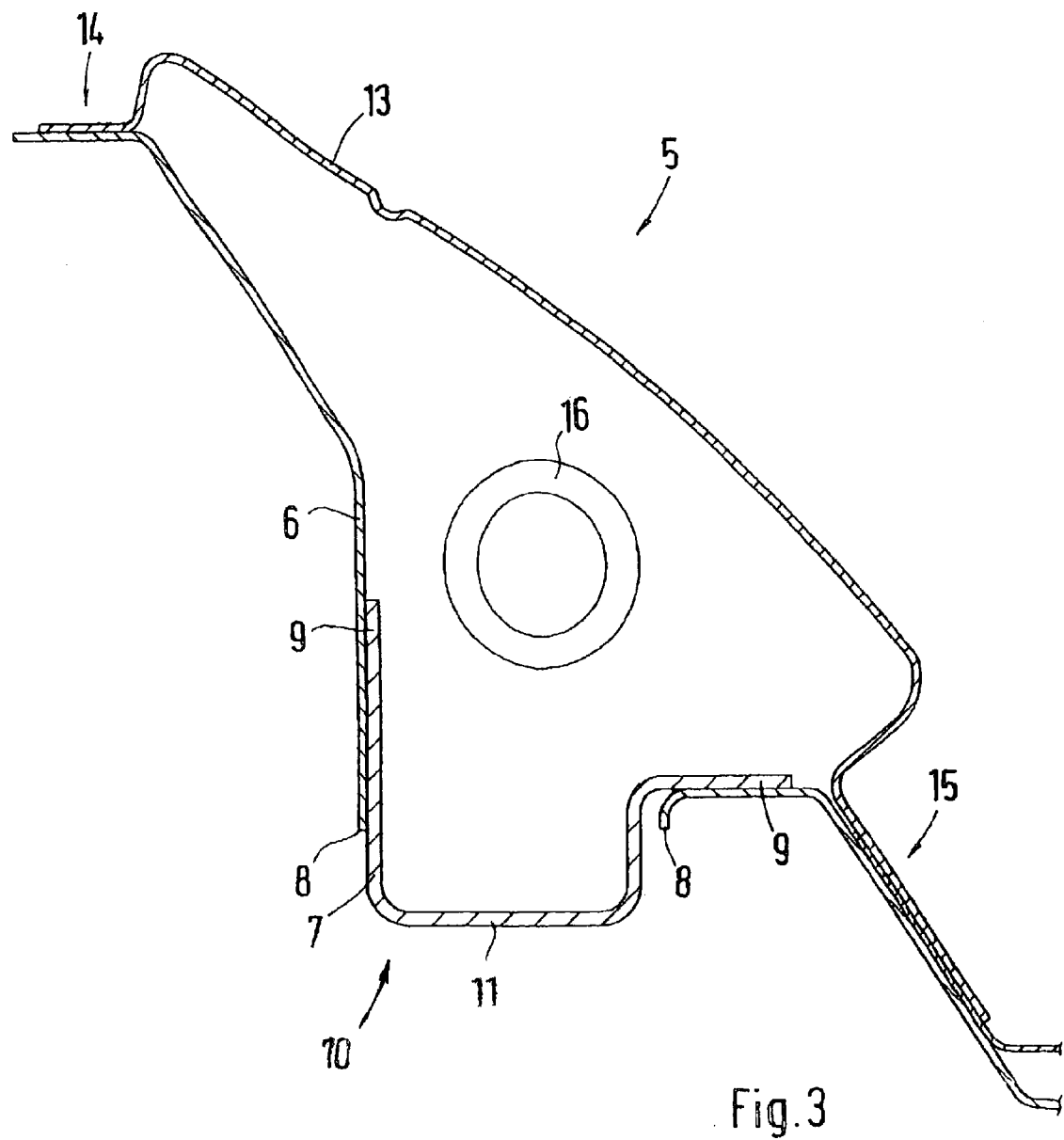
FIG. 3 is a cross-sectional view of a side member.

The belt roller 3 is screwed to a console 7, illustrated in FIG. 3 in a sectional view, serving as the fastening device. The console 7 is inserted from the interior into a cutout 8 of the half shell 6. The console 7 is provided with a surrounding edge 9 which rests against the half shell 6 and is connected with the half shell 6 by point welding. The edge 9 is shaped such that it reaches behind the cutout 8 along an area which is as large as possible. In the center area of the console 7, a pot-shaped area 10, which is fitted through the cutout 8, is formed. On the bottom of the pot-shaped area 10, a surface or wall 11 is formed which is used as a contact surface for the belt roller 3. A weld nut (not shown here) is mounted on the rearward side of the surface 11 in order to be able to fasten the belt roller 3 on the console 7 with a screw 12 (see FIG. 2).

Finally, a tube 16 for reinforcing the vehicle body is also accommodated in the side member 5.

After insertion of the console 7 in the cutout 8 of the lower half shell 6 and the welding-together of the two parts, the tube 16 is inserted, and the side member 5 is completed by adding the upper half shell 13. The half shells 6, 13 are finally connected with one another in the edge areas 14, 15 by welding.

The edge 9 of the console 7 is therefore situated inside the side member 5, while the pot-shaped area 10 of the console 7 projects out of the side member 5 through the cutout 8. The position of the surface 11 is selected such that a horizontal installed position is obtained for the belt roller 3. When the belt roller 3 is loaded in the event of an accident, the console 7 is stressed in the sense of a pulling-out from the cutout 8. This is prevented by the welded connection between the edge 9 and the lower half shell 6 as well as additionally by the portion of the edge 9 reaching behind the cutout.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A fastening device for a belt roller in a motor vehicle, the belt roller being mounted on the fastening device, the fastening device having a pot-shaped area with a completely surrounding edge, the fastening device being inserted in a cutout of a vehicle body part from an interior of the vehicle body part so that the pot-shaped area extends through the cutout and the fastening device is connected by way of the surrounding edge extending behind the cutout and resting against the vehicle body part.

2. The fastening device according to claim 1, wherein the pot-shaped area is constructed for accommodating the belt roller.

3. The fastening device according to claim 2, wherein the pot-shaped area includes a surface disposed in a selected position, and wherein a defined angular position of the belt roller can be set by way of said selected position.

4. The fastening device according to claim 3, wherein the fastening device positions the belt roller accommodated by the pot-shaped area essentially in a horizontal and suspended manner.

5. The fastening device according to claim 3, wherein the motor vehicle has a fast back.

6. The fastening device according to claim 4, wherein the motor vehicle has a fast back.

* * * * *